Sept. 26, 1939.     F. W. SULLINGER ET AL     2,174,014
DIRECTION FINDER
Filed Feb. 4, 1937     2 Sheets-Sheet 1
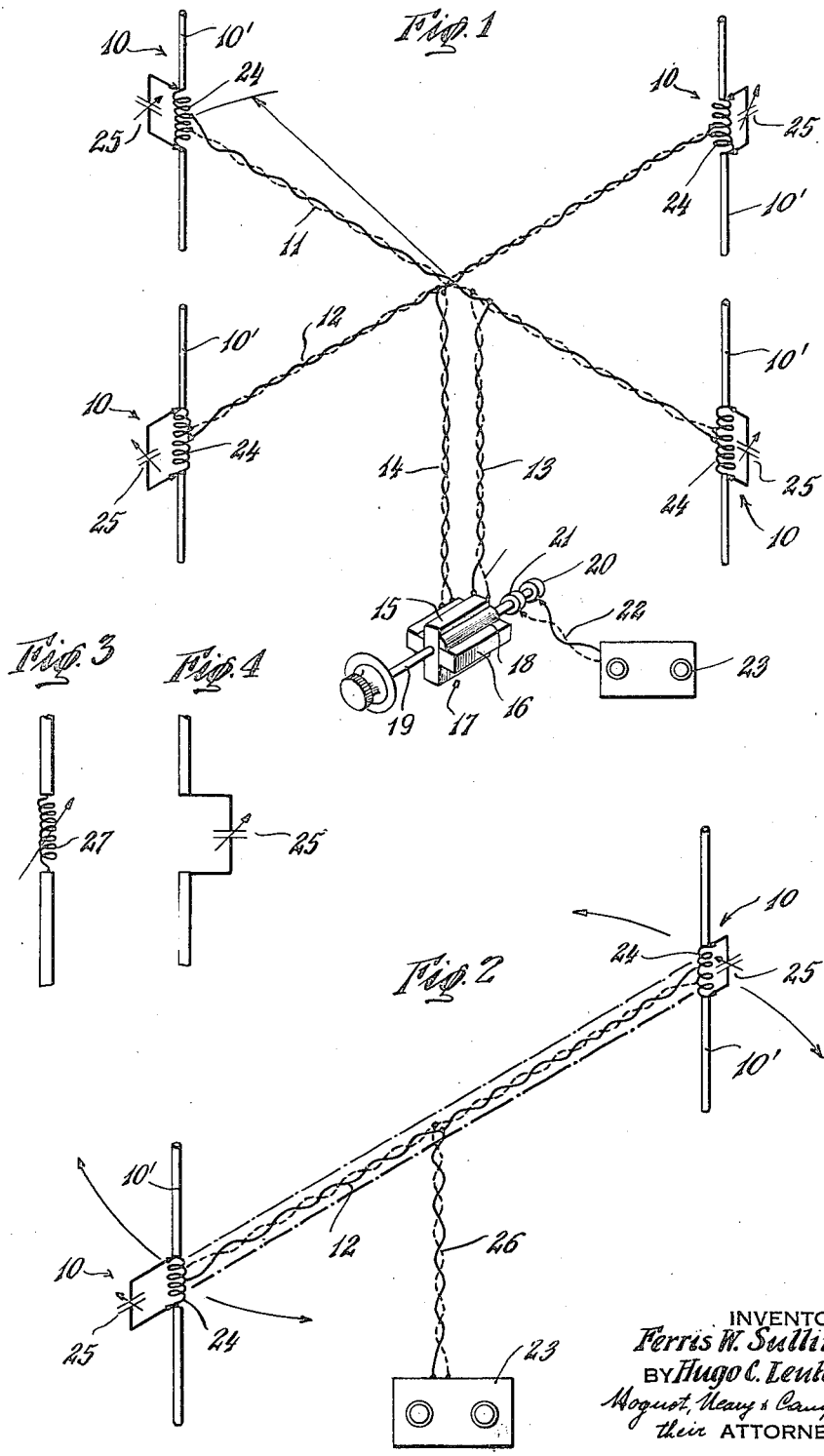

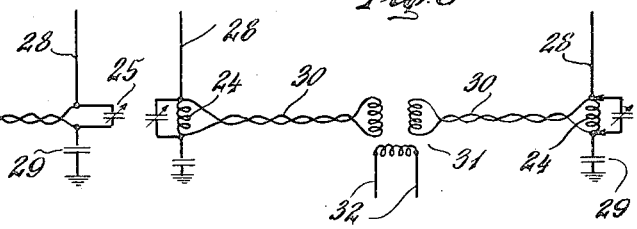
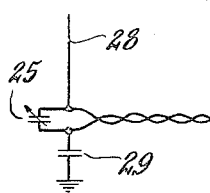
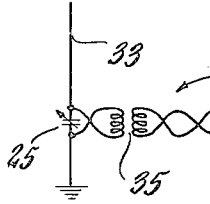
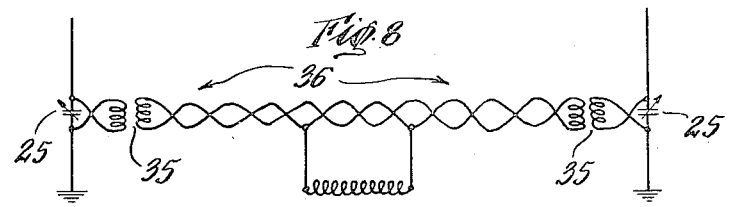
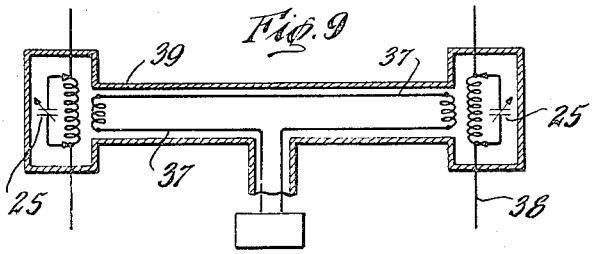
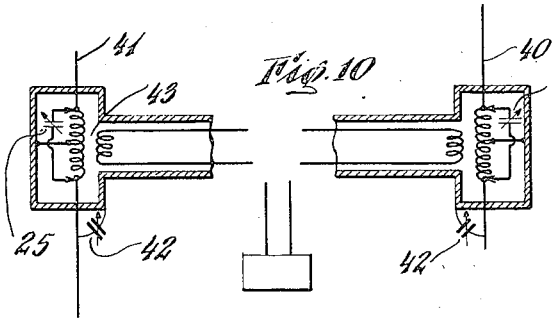
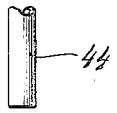
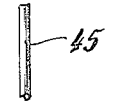
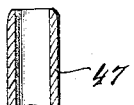
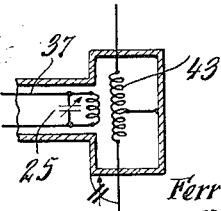

Patented Sept. 26, 1939

2,174,014

UNITED STATES PATENT OFFICE 2,174,014

DIRECTION FINDER

Ferris W. Sullinger, Coral Gables, Fla., and Hugo C. Leuteritz, Rockville Centre, N. Y., assignors to Pan American Airways Corporation, Jersey City, N. J., a corporation of Delaware Application February 4, 1937, Serial No. 124,108

15 Claims. (Cl. 250—11)

This invention relates to antenna systems, and more particularly to radio direction finders.

The original Adcock type of radio direction finder consisted of four vertical dipole antennas spaced 90° apart, each dipole having an upper and a lower arm connected in phase opposition by means of horizontal conductors with the lower and upper arm respectively of the opposite dipole; the mid-points of the horizontal conductors being connected to a goniometer, which is in turn connected to a conventional radio receiver.

This direction finder is subject to the well known "night effects" caused by the horizontally polarized electric field component perpendicular to the plane of propogation of the received wave. This horizontal component is received by the horizontal conductors of the radio direction finder and conducted to the goniometer along with the principal or vertically polarized component of the wave which is received by the vertical dipoles. The horizontal component current received by the goniometer reflects untrue course variations of the airplane or other moving craft or fixed stations from which the received wave is transmitted. Accordingly, the direction finder does not give accurate indications of the transmitting station's bearing.

Many attempts have been made heretofore to eliminate the horizontal component, and thereby the misleading "night effects", by shielding the horizontal conductors. These expedients have reduced but have not satisfactorily eliminated "night effects".

The direction finding accuracy of the Adcock system, as well as that of the more recent and improved direction finders, has been adversely affected by the electrical dissymmetry or capacity unbalance of the system. One cause of this adverse effect is the closer proximity of the earth to the lower arms of the dipoles than to the upper arms. For example, the capacity of the lower arms of the diploes with respect to radio frequency ground is appreciably greater than the capacity of the upper arms with respect to radio frequency ground. This difference in capacity destroys the electrical symmetry of the dipole antenna with the result that the horizontal electric component of a received wave induces currents in the direction finder in such manner as to prevent tuning of the system to sharp minima, thereby giving rise to errors similar to those produced by "night effects".

A number of proposals have been made in the prior art to overcome this disadvantage of electrical dissymmetry of the vertical dipole direction finders. All of these proposals are characterized by attempts to balance the capacity between the upper arm of each dipole and ground with the capacity between the lower arm of each dipole and ground. This method, however, seeks merely to balance each dipole individually with respect to its constituent parts and does not contemplate balancing the entire dipoles with respect to each other.

The means commonly used for individual balancing of each dipole is a condenser, fixed or variable, which is electrically connected in the dipole circuit and is usually located in one arm of the dipole. The condenser serves to either increase or decrease the capacity of the arm in which it is connected, depending upon the type of connection used, and to thus equalize the capacity of the lower and upper arms of each individual dipole with respect to ground.

These prior art capacity balancing arrangements have not been satisfactory, mainly for two reasons. First, the capacity balance, even if initially established, which is difficult to do accurately, will become unbalanced with varying ground conditions. In practice, weather changes will produce different radio frequency ground levels and thereby upset the capacity balance between the lower and upper arms of each dipole. Secondly, weather changes will produce different radio frequency ground levels for different dipoles of the direction finder, so that opposite dipoles as a whole are not balanced with respect to each other.

In accordance with our invention we have overcome all of the above mentioned disadvantages and limitations of the prior art systems and have produced a direction finder which is entirely electrically symmetrical and which will maintain this condition regardless of weather changes or other variable factors. This direction finder will, because of its fine electrical balance, give accurate indications of the direction of arrival of received waves during the entire night and day and consistently produces sharper minima than the prior art systems.

We have discovered that in order to establish and maintain an exact electrical balance in the radio direction finder, it is essential to overcome the varying ground capacity effects and to adjust the capacities of the opposite dipoles as a whole, so that they will be maintained in equilibrium with each other. One of the characteristic features of our direction finder is the sharp minima or null effect produced in the receiver by received waves, whereby the direction of the signal source is sharply and accurately indicated.

An object of our invention is to produce a radio direction finder that is electrically symmetrical and accurately indicates at all times the exact direction of arrival of received waves. Other objects and advantages of our invention will become apparent from a consideration of the following description taken in conjunction with the accompanying drawings in which:

Figure 1 is an illustrative embodiment of our radio direction finder of the elevated spaced-fixed type;

Figure 2 is an illustrative embodiment of our direction finder of the elevated rotary type;

Figures 3 and 4 illustrate two different modifications of the dipoles shown in Figures 1 and 2;

Figures 5, 6, 7 and 8 illustrate our radio direction finder of the vertical aerial type having the lower arms grounded;

Figure 9 illustrates our radio direction finder of elevated dipole type having the horizontal transmission lines and a portion of the dipoles enclosed in a metallic shield;

Figure 10 is a modification of Figure 9 wherein the upper and lower arms of the dipoles are of different length;

Figure 11 shows a modification of Figure 10;

Figure 12 illustrates a dipole having an upper arm of greater diameter than its lower arm; and Figure 13 illustrates a dipole having a screw in its lower arm for changing the effective length of that arm.

The novel features of our invention may be adapted to various types of radio direction finders such as the arrangements illustrated in Figures 5 to 10. We have found it advantageous to employ the arrangements illustrated in Figures 1 and 2. Referring now to the drawings and in the first instance to Figure 1, it will be noted that our radio direction finder in this embodiment comprises four vertical elevated dipoles 10 spaced 90° apart, each having a lower and an upper arm 10'. Opposite dipoles are electrically connected in phase opposition by means of transposed transmission lines 11 and 12, the latter being spaced 90° apart. Lead lines 13 and 14 connect the center points of transmission lines 11 and 12 respectively with the two stator coils 15 and 16 of the radio goniometer 17. This goniometer is of conventional type and has a search coil 18 which is rotatable in the stator coils 15 and 16 by shaft 19. The search coil 18 is connected through slip rings 20 and 21 and lead lines 22 to a conventional type receiver 23. Each of the dipoles 10 shown in Figure 1 is provided with a matching transformer 24 which is connected in series between the upper and lower halves of each dipole, and a variable condenser 25 connected in shunt with each of the matching transformers.

In order to produce sharp minima and thereby give accurate bearings upon a transmitting station, the electromotive force delivered by opposite dipole antennae assemblies to the mid-point of their transmission line must be the same. This electromotive force is affected by a number of conditions, as, for example, the overall length of the antenna, the total inductance of the coil or other means used for connecting the upper and lower arms of the dipoles, the inductance of that portion of the connecting coil across which the transmission line is tapped, the attenuation of the transmission line and the capacity across the connecting coil. In practice the last mentioned condition has been found to vary most and thus produce the greatest variation in the electromotive force, the variations in the other conditions being minute.

Wide variations in E.M.F. are likely to occur particularly when the opposite dipole assemblies are spaced a considerable distance apart, because under this condition the distance of true radio frequency ground below the surface of the earth may vary considerably at the dipole locations. With different spacings of the dipole assemblies from true radio frequency ground, the capacity of the dipole assemblies across the matching transformers may be considerably different. Since the capacity is principally that of the antenna rods of the assembly, it is evident that this capacity will be appreciably different, depending on the spacing of the antenna from true radio frequency ground.

In order to avoid the difficulties resulting from unequal capacities to ground of the upper and lower half of each dipole, the dipoles are elevated at a sufficient height to render negligible this difference in capacity. In this manner variations in ground conditions and accordingly variations in the radio frequency ground level have a negligible effect upon the capacity balance of the dipoles, so that once the direction finder is balanced it will remain balanced regardless of normal varying ground conditions.

The electrical symmetry of the direction finder may now be established, once the ground variations have been eliminated, by adjusting the capacity of the several dipoles so that the overall capacity of each dipole will be the same as that of the opposite dipole. This may be accomplished by proper adjustment of the variable condenser 25. For example, if the condenser 25 of one of the dipoles is set at its mid-point and the condenser of the opposite dipole is properly adjusted, the capacities of these two dipoles may be very accurately balanced. The same procedure would be applied for balancing the other two oppositely positioned dipoles.

In practice, one convenient method for balancing the direction finder as above suggested, to equalize the capacities of opposite dipoles and thereby produce the same E.M.F. from each dipole 10 at the mid-point of the transmission line 11 and 12, is as follows:

The complete system being installed in an operative position, a local radio frequency oscillator is placed on the ground in line with the north and south dipoles and a short distance beyond either. The goniometer search coil 18 is then turned to give minimum signal output from the receiver 23, which is tuned to the oscillator frequency.

The variable condenser 25 of either the east or west dipole is then varied by means of a light insulating rod, such as a bamboo pole, which may be slotted at one end to engage the rotor shaft of the variable condenser 25. This variation is carefully made until a setting is found which gives the sharpest minimum or nil signal output from the receiver. The east and west dipole assemblies are now balanced.

To balance the capacities of the north and south dipoles, the local oscillator is positioned in line with the east and west dipoles and a short distance beyond either. The same procedure described just above is then carried out for balancing the north and south dipoles.

The matching transformers 24, which are connected in series with the upper and lower arms of the dipoles, serve the purpose principally of matching the impedance of the dipoles with the impedance of the transmission lines 11 and 12. If these impedances are matched, the energy transmission efficiency of the direction finder will be at a maximum, that is, a maximum amount of the energy received by the several dipoles will be transmitted to the mid-points of the transmission lines and thence to the goniometer 17 and receiver 23. This will permit reception of signals from relatively distant transmitting stations. The range of the direction finder is thereby appreciably increased over the prior art direction finders, which do not employ these matching transformers and therefore do not provide for matching the impedance of the dipoles with the impedance of their transmission connecting lines. When these impedances are properly matched, in accordance with our invention, the transmission lines such as 11 and 12 of Figure 1 do not act as parts of the aerial system but serve only as transmission lines. As such they are not receptive to the horizontal component of the received wave and therefore do not conduct currents to the goniometer which would give false course variations.

It will be seen from the above description of the variable condenser-matching transformer arrangement that our direction finder is accurately electrically balanced and matched. Accordingly, it will give constantly and uniformly accurate and reliable indications of the direction of received waves, which indications are characterized by sharp minima.

Another advantage of our improved direction finder resides in the fact that the individual elements of the aerial system, as for example, the upper and lower dipole rods and matching transformers, need not be manufactured within the close tolerances usually required, some variations being readily compensated by the adjustment of the variable condensers.

A further advantage obtained is that any small changes occurring in the matching transformers after installation can be compensated by adjustment of the variable condensers without necessitating replacement of the transformers. Also, if the matching transformer is properly designed, the adjustment of the balancing condenser does not affect appreciably the electrical phase angle of the antenna system, its only effect being in the magnitude of the E. M. F. supplied to the transmission line, which is the desired result.

In the construction disclosed in Figure 2, two dipole assemblies 10 of a type similar to those of Figure 1 are connected by the transmission line 12, and the whole system mounted for rotation about the center line midway between and parallel to the dipole assemblies. The lines 12 are connected at either side of center taps on the matching transformers 24. Now if the dipoles are mounted at such a height that there is an appreciable difference in capacity to ground of the upper and lower halves, the increased capacity of the lower half can be compensated for by raising the points on the transformer where the transmission line connects. Likewise, if the capacity between the upper half of the dipole and ground is greater than the capacity between the lower half of the dipole and ground, the points on the transformer where the transmission line connects are lowered.

Lead line 26 connects the center point of transmission line 12 at the receiver 23. The balancing condensers 25 are connected in shunt with the matching transformers 24, the same as in Figure 1.

In balancing the capacity of either the spaced-fixed system shown in Figure 1 or the rotating system in Figure 2 after permanent installation, the variable condensers 25 may be properly adjusted through the use of a light, non-conducting rod. In actual practice, the use of balancing condensers 25 has proven highly satisfactory, resulting in the production of the desired sharp minima in signals received from any and all directions, thereby indicating the direction of the signal source with great accuracy. The accurate impedance matching produced by the matching transformers has made it possible to use or direction finder with marked success for distances as high as 1800 miles, and under favorable conditions up to 8400 miles.

Instead of the dipole assemblies shown in Figure 1, the modified form shown in Figures 3 and 4 may be used. As shown in Figure 3, one modification consists of omitting the variable condenser and using a variable inductance 27. This inductance serves the purpose of matching impedances of the dipole assemblies with those of the transmission lines and its variable characteristic permits balancing the capacities of opposite dipoles, although the balancing could be effected more expeditiously by means of a variable condenser.

The modification illustrated in Figure 4 consists of omitting the matching transformer and using only the variable condenser. The latter would be used to balance capacities of the dipole assemblies so that opposite dipoles would have their capacities in equilibrium. The omission of the transformer would result in a substantial decrease in the energy transmission efficiency of the system. Practically speaking, this would mean that the signal received by the receiver 23 would be substantially weaker than that received with the matched transformer-condenser type direction finder. Consequently, the range of the direction finder would be substantially reduced. It is thus apparent that the modifications suggested in Figures 3 and 4 would not be preferred and would not offer the commercial advantages of the system shown in Figure 1 or Figure 2 but might be used with satisfactory results in certain cases.

The direction finder shown in Figure 5 is an example of our invention when applied to grounded vertical aerial systems. The two vertical aerials 28 are grounded, as shown, and contain condensers 29 in the lower part of the aerial near the grounded connection. The variable condensers 25 would serve the same purpose for balancing the system as disclosed in the preceding discussion of Figures 1 to 4.

The direction finder shown in Figure 6 is like that of Figure 5 except that the mid-point of the transmission lines 30 is inductively connected as shown at 31 to the goniometer lead wires 32. Also, in this system the matching transformers 24 are employed for matching the impedances of the transmission lines 30 with the vertical aerials 28.

In Figure 7 a vertical aerial system is illustrated having two grounded vertical antennae 33 connected to transmission lines shown generally at 34, the transmission lines being separated into sections with the several sections inductively coupled to prevent pick-up of the horizontal component. In this arrangement the matching transformers are located in the transmission lines near the vertical antennae as shown at 35. The variable condensers 25 serve to balance capacities of the opposite vertical antennae 33.

The modification shown in Figure 8 is like that of Figure 7 except that the transmission lines 36 are continuous between the two matching transformers 35.

In Figure 9 the symmetrical vertical elevated antenna system has its horizontal transmission lines 37 and their connections with the vertical antennae 38 shielded by complete metallic shield 39. This shield serves the function of avoiding, at least to some extent, the pick-up of the horizontal component of the received wave. The variable condensers 25 serve to balance capacities of the opposite vertical dipoles 38 for the aforementioned purposes.

The modification shown in Figure 10 is like that of Figure 9 except that a non-symmetrical antenna arrangement is used in which the vertical dipoles 40 and 41 have upper and lower arms of different lengths. A variable condenser 42 is provided between each lower dipole arm and the metallic shield to balance out the electrical coupling between these members. Matching transformers 43 serve to match the impedances in the aforementioned manner and the variable condensers 25 balance capacities of the opposite dipole.

In Figure 11 there is shown a modification of the assemblies shown in Figure 10 in which the variable condenser 25 is connected across the secondary of the matching transformer 43 instead of the primary, as in Figures 9 and 10.

In Figure 12 there is illustrated a modified form of dipole in which the upper rod is of greater diameter than the lower rod. The purpose of this construction is to balance out the normally larger capacity of the lower rod caused by its closer proximity to ground. This type of dipole might be used with any suitable form of connection between the lower and upper rods 44 and 45. For example, the connection might consist of our matching transformer 24 or variable condenser 25 or a combination of these two or any other suitable means.

In Figure 13 the modification consists of providing a screw 46, or any other suitable device, in the lower arm 47 of the dipole. By turning this screw in clockwise and counter-clockwise directions the effective electrical length of the arm 47 may be varied so as to effect a balance of the capacity between this arm and ground with the capacity between the upper arm 48 and the ground. It can also be used to balance capacities of opposite dipoles. Similarly to the arrangement shown in Figure 12, the connections between the upper arm 48 and lower arm 47 of this dipole assembly may be of any suitable type.

It is to be understood that various modifications may be made in the construction and method of operation disclosed hereinabove without departing from the scope of our invention.

We claim:

1. A radio direction finder comprising at least two substantially vertical spaced dipole antennae, transmission lines electrically connecting the poles of said antennae in phase opposition, and means electrically connected between the poles of each of said antennae for maintaining said antennae in electrical symmetry, whereby said antennae supply equal electromotive forces to the electrical center point of the radio direction finder.

2. A radio direction finder comprising at least two substantially vertical spaced dipole antennae, transmission lines electrically connecting the poles of said antennae in phase opposition, and variable capacitance means electrically connected to said antennae for balancing the capacities of said antennae, whereby said antennae supply equal electromotive forces to the electrical center point of the radio direction finder.

3. A radio direction finder comprising at least two substantially vertical spaced antennae, each having an upper and a lower portion, transmission lines electrically connecting said upper and lower portions of said antennae in phase opposition, and a variable inductance electrically connected between the upper and lower portions of each of said antennae for maintaining said antennae in electrical symmetry, whereby said antennae supply equal electromotive forces to the electrical center point of the radio direction finder.

4. A radio direction finder comprising a pair of elevated spaced vertical dipoles located at a height sufficiently above ground to render negligible any difference of capacity between the lower portion of each dipole and ground and the upper portion of each dipole and ground and sufficient to prevent radio frequency ground variations from affecting the capacities of the several dipoles and connected in phase opposition by interposed transmission lines, and means electrically connected between the poles of each dipole for maintaining said dipoles in electrical symmetry.

5. A radio direction finder comprising a pair of elevated spaced dipoles connected in phase, opposition by interposed transmission lines each dipole having an upper and a lower arm and being so positioned with respect to ground that the capacities between the upper and lower arms of each dipole and ground are substantially the same, and means electrically connected between the poles of each dipole for balancing the capacities of said dipoles.

6. A radio direction finder comprising at least two substantially vertical spaced antennae, each having an upper and a lower portion, said lower portion of each of said antennae being grounded, transmission lines electrically connecting said upper and lower portions of said antennae in phase opposition, and means electrically connected between the upper and lower portions of each of said antennae for maintaining said antennae in electrical symmetry, whereby said antennae supply equal electromotive forces to the electrical center point of the radio direction finder.

7. A radio direction finder comprising a pair of vertical spaced dipoles connected in phase opposition by transmission lines, each dipole having an upper and a lower portion, and a variable condenser electrically connected therebetween for adjusting the capacity of said dipoles to a state of equilibrium.

8. A radio direction finder comprising a pair of elevated spaced dipoles, each dipole having an upper and a lower arm and being so positioned with respect to ground that the capacities between the upper and lower arms of each dipole and ground are substantially the same, means including a variable condenser electrically connected between the upper and lower arms of each dipole for balancing the capacities of said dipoles, interposed transmission lines connecting said dipoles in phase opposition, and means connecting said transmission lines with said dipoles so that the electrical impedances of said transmission lines and dipoles are properly matched.

9. A radio direction finder comprising a pair of elevated spaced dipoles, transmission lines connecting said dipoles electrically in phase opposition, and a matching transformer connected between the upper and lower portions of each dipole, said transmission lines being connected to taps on said matching transformers, which taps are located below the electrical center point of said transformers to compensate for any greater capacity between the upper portion of said dipole and ground and the lower portion of said dipole and ground.

10. A radio direction finder comprising a pair of elevated spaced dipoles, transmission lines connecting said dipoles electrically in phase opposition, and a matching transformer connected between the upper and lower portions of each dipole, said transmission lines being connected to taps on said matching transformers, which taps are located above the electrical center point of said transformers to compensate for any greater capacity between the lower portion of said dipole and ground and the upper portion of said dipole and ground.

11. A radio direction finder comprising a pair of vertical spaced dipoles connected in phase opposition by interposed transmission lines, each dipole containing an upper and a lower portion, and a matching impedance and variable capacity electrically connected between said upper and lower portions of each dipole for maintaining the direction finder in accurately balanced and matched condition.

12. In a radio direction finder, having at least two substantially vertical spaced dipole assemblies connected by transmission lines in a non-resonant circuit, each of said dipole assemblies comprising an upper and a lower portion, a variable condenser and a matching transformer connecting the upper and lower portions of said dipole assembly.

13. A radio direction finder comprising a plurality of vertical spaced dipoles, each dipole containing an upper and a lower portion, a variable condenser and a matching transformer connecting the upper and lower portions of each dipole, and interposed transmission lines connecting opposite dipoles in phase opposition, said transmission lines being connected to terminals on either side of the electrical center point of said matching transformers.

14. A radio direction finder comprising two opposite dipole assemblies, each assembly having an upper and a lower arm connected together by a matching transformer and a variable condenser, and transmission lines connecting the two opposite dipole assemblies, said dipole assemblies and transmission lines being rotatable about an axis substantially midway between and parallel to the dipoles.

15. A radio direction finder comprising a plurality of symmetrical vertical dipoles each having an upper and a lower portion connected through a matching transformer and variable condenser, transmission lines extending between opposite dipoles and inductively connected thereto, and a metallic shield enclosing said transmission lines and their connections with said vertical dipoles.

FERRIS W. SULLINGER.
HUGO C. LEUTERITZ.